United States Patent [19]

Onda et al.

[11] Patent Number: 4,700,280

[45] Date of Patent: Oct. 13, 1987

[54] SWITCHING POWER SUPPLY USING A SATURABLE REACTOR TO CONTROL A SWITCHING ELEMENT

[75] Inventors: Kenichi Onda; Kojin Abe, both of Hitachi; Tsugio Ogawa, Kumagaya, all of Japan

[73] Assignees: Hitachi, Ltd.; Hitachi Metals, Ltd., both of Tokyo, Japan

[21] Appl. No.: 854,022

[22] Filed: Apr. 21, 1986

[30] Foreign Application Priority Data

| Apr. 19, 1985 | [JP] | Japan | 60-82478 |
| Jul. 8, 1985 | [JP] | Japan | 60-148302 |
| Feb. 10, 1986 | [JP] | Japan | 61-27381 |

[51] Int. Cl.[4] ............................................ H02M 3/338
[52] U.S. Cl. .......................................... 363/19; 363/49; 363/131
[58] Field of Search ............... 363/19, 21, 97; 363/49, 363/131

[56] References Cited

U.S. PATENT DOCUMENTS 3,697,851 10/1972 Mast ....................................... 363/19

FOREIGN PATENT DOCUMENTS

| 39452 | 4/1978 | Japan | 363/19 |
| 117708 | 10/1978 | Japan | 363/19 |
| 52489 | 7/1981 | Japan | . |
| 116070 | 7/1983 | Japan | 363/19 |
| 32224 | 9/1984 | Japan | . |

OTHER PUBLICATIONS

Kohuo et al., "A Saturable Reactor Controlled Ringing Choke Converter", INTELEC Conference Paper, pp. 265-271, Wash. D.C. (26-29, Nov. 1969).
Harada et al., "Pulse Synchronizing DC-to-DC Converters", PESC '80 Conference Paper, pp. 302-307, Atlanta, Ga. (16-20, Jun. 1980).

Primary Examiner—William H. Beha, Jr.
Attorney, Agent, or Firm—Antonelli, Terry & Wands

[57] ABSTRACT

In a self-oscillating type switching power supply in which an input source, a primary winding of a transformer, and a switching element are connected in series, and a constant output is supplied to a load from a secondary winding of the transformer by the operation of the switching element, in order to obtain a signal to turn off the switching element, a sense circuit for detecting the output of the switching power supply is provided, and the analog signal from the sense circuit is inputted to one winding of a saturable reactor, and at a time point when the switching element is to be turned off, the analog input signal is converted into a pulse signal insulated from the analog input signal, and the pulse signal is outputted from another winding of the saturable reactor. By such a system, a switching power supply having a very simple circuit arrangement and high output voltage precision can be achieved.

18 Claims, 18 Drawing Figures

SWITCHING POWER SUPPLY USING A SATURABLE REACTOR TO CONTROL A SWITCHING ELEMENT

BACKGROUND OF THE INVENTION

The present invention relates to a switching power supply.

A self-oscillating switching power supply which utilizes the principle of a blocking oscillator has an advantage in that circuit arrangements are simple. In such a self-oscillating type switching power supply, in order to electrically isolate the primary side from the secondary side, a photocoupler is generally used as described in Japanese Utility Model Examined Publication No. 59-32224 (1984). In other words, in the prior art self-oscillating type switching power supply, as described in this Japanese Utility Model Unexamined Publication, such a system is employed in which an analog signal representative of a detected output of the switching power supply is applied to a photocoupler, and the oscillation of a switching element is controlled by an analog output generated from the photocoupler in accordance with the analog signal. However, in this system, since the signal transmission gain of the photocoupler is small, sufficient precision of the output control of the switching power supply can not be obtained. The precision has been about ±5%.

Moreover, there is a drawback that the photocoupler which can be used as a switching power supply must be safe, providing sufficiently high dielectric strength between the primary side and the secondary side, and consequently, a photocoupler satisfying such requirements is expensive. Further, another drawback is that since a photo diode in the photocoupler is required to be supplied with a current equal to 100 mA or more, the power consumption in the control circuit increases, and thus the efficiency becomes low.

In Japanese Utility Model Unexamined Publication No. 56-52489 (1981), there is disclosed a DC-DC converter in which the length of an ON period of a switching transistor is controlled by using a saturable reactor. In such a DC-DC converter, however, there is a drawback in that since it is not the self-coscillating type, a control circuit for the switching transistor is complicated. In the present invention, the switching transistor is controlled also by using the saturable reactor, however, inventors of the present application have established a circuit arrangement using a saturable reactor in the self-oscillating switching power supply, and have solved problems inherent in using the saturable reactor in the self-oscillating type as will be described later.

SUMMARY OF THE INVENTION

An object of the present invention is to provide a switching power supply in which the output precision is improved by using, in place of a photocoupler, a saturable reactor which insulates the input from the output, and which is still capable of increasing the signal transmission gain.

Another object of the present invention is to provide a switching power supply which is simple in structure and which is high in reliability.

Another object of the present invention is to provide a switching power supply which prevents breakage of the switching power supply due to excessive resetting of a saturable reactor which determines the ON period of a main transistor.

Still another object of the present invention is to provide a switching power supply which is high in efficiency.

Still another object of the present invention is to provide a switching power supply which is simple in circuit arrangement and which is inexpensive.

In order to achieve the objects mentioned above, in accordance with one aspect of the present invention, a self-oscillating type switching power supply wherein an input DC power source, a primary winding of a transformer, and a switching element are connected in series, and a constant output is supplied to a load from a secondary winding of the transformer, includes a sense circuit for detecting the output of the switching power supply in order to obtain a signal to turn off the switching element, and a signal transmission element having a saturable reactor supplied with an analog signal from the sense circuit for converting the analog input signal into a pulse signal insulated therefrom at a time point at which the switching element is to be turned off and for outputting the converted pulse signal.

The photocoupler has a small signal transmission gain which is called a CTR (current transformer ratio), and even when the output of the switching power supply is changed, no large change in current is obtained in the output of the photocoupler. As a signal transmission element which has no such drawback, the inventors of the present application studied, for example, a saturable reactor. Since, the saturable reactor has a large permeability $\mu$ as will be described later, it is possible, by merely controlling an exciting current slightly, to vary a period during which the saturable reactor exhibits a high impedance condition when a high voltage is applied. In addition, the transition from a high impedance condition which is the non-saturated state to a low impedance state which is the saturated state is very rapid, and thus the output assumes a pulse shape. As a result, even when a circuit operated by the output signal of the saturable reactor having a threshold voltage for its operation, it is possible to reduce the influence of the threshold voltage.

By virtue of the above-mentioned operation of the saturable reactor, which will be described in detail in connection with the embodiments, it is possible to compensate for the drawbacks of the photocoupler, and to determine the time at which the switching element is to be turned off with high precision so that the output voltage of the switching power supply is made constant.

According to another aspect of the present invention, in a switching power supply wherein an OFF period of the self-oscillation is made constant and an ON period is controlled by using a saturable reactor to stabilize the output voltage, it is arranged so that the excessive resetting of the saturable reactor and the saturation of a transformer are prevented by varying the maximum amount of change of the flux density of the saturable reactor in proportion to the magnitude of a DC input voltage, and that even when a small transformer is used, the damage of the power supply per se due to the breakage of the switching element is not caused.

According to a further aspect of the present invention, in a switching power supply wherein an OFF period of the self-oscillation is made constant, and an ON period is controlled by using a saturable reactor to stabilize the output voltage, in order to limit a maximum value of the ON period, means for determining a maximum value of a change in flux density of the saturable reactor is provided, whereby the excessive resetting of the saturable reactor and the saturation of a transformer are prevented. As a result, even when a small transformer is used, the damage of the power supply due to the breakage of the switching element is not caused.

DESCRIPTION OF THE PREFERRED EMBODIMENTS

With reference to the drawings, embodiments of the present invention will be described hereinafter.

Figure 1:
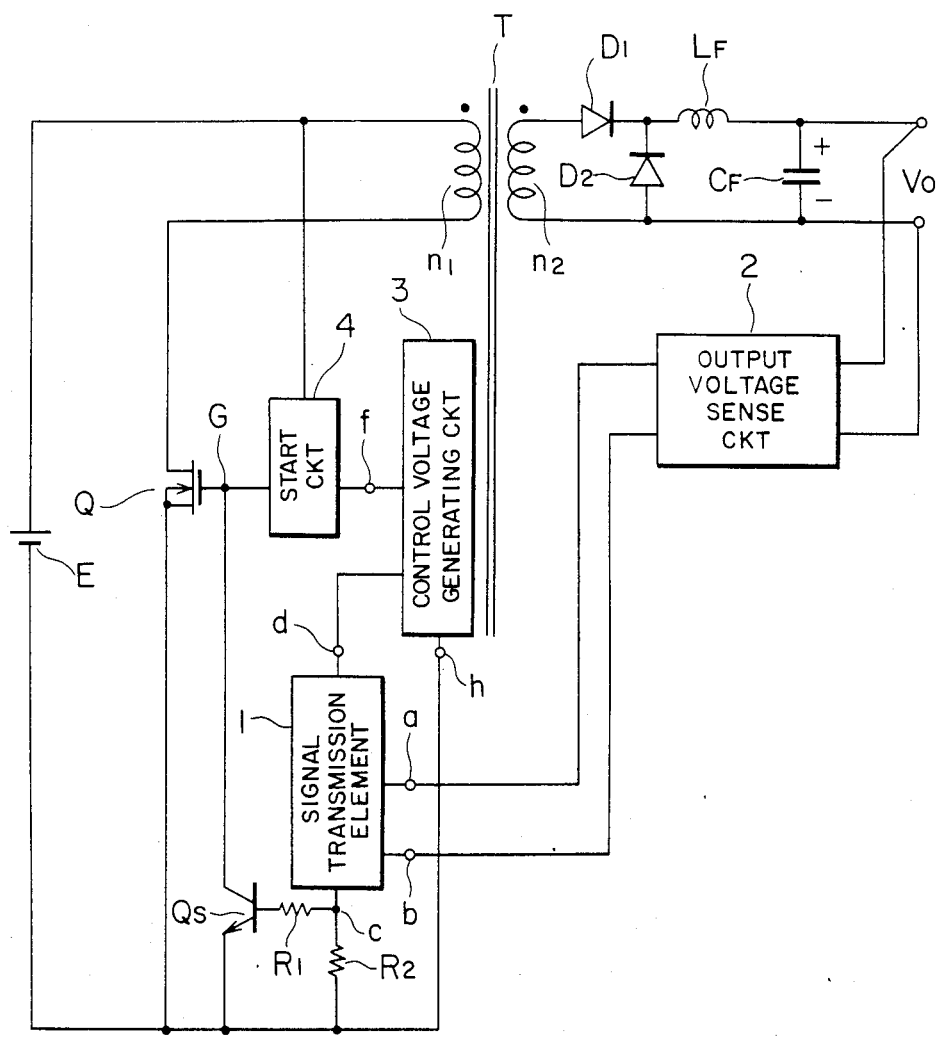
FIG. 1 is a circuit diagram showing an embodiment of the present invention.

FIG. 1 is a circuit diagram showing an embodiment of the invention.

In the Figure, reference numeral 2 designates an output voltage sense circuit for detecting an output voltage $V_0$ of a switching power supply, and it supplies an analog output corresponding to a change in the output voltage $V_0$ to a signal transmission element 1 including a saturable reactor. In the switching power supply, since a primary side and a secondary side of a transformer T are insulated from each other, the signal which represents the detected output voltage $V_0$ of the switching power supply is also insulated in the signal transmission element 1. Further, the signal transmission element 1 supplies to an output terminal c a pulse signal which transits from a low level to a high level at a time point at which a switching element Q is to be turned off. In response to this signal, a base current is supplied to an NPN bi-polar transistor $Q_s$ through a base current limiting resistor $R_1$, and the transistor $Q_s$ is turned on. As a result of the turning on of the transistor $Q_s$, a gate G which is a control electrode of a MOS transistor constituting the switching element Q is grounded to thereby turn off the switching element Q. In this manner, the signal transmission element 1 and the transistor $Q_s$ constitute a switch to turn off the switching element Q. A load current flowing from a DC output source E through a path including a primary winding $n_1$ of the transformer T, and two main electrodes of the switching element Q during the conduction period of the switching element is interrupted due to the turning off of the switching element Q, and thus, a current which has been outputted from a secondary winding $n_2$ of the transformer T through a rectifier diode $D_1$ is also interrupted. Characters $L_F$ and $C_F$ designate respectively a reactor and a capacitor for smoothing the output, and $D_2$ designates a diode for returning a current of the reactor $L_F$.

Further, the signal transmission element 1 is capable of changing a phase or a time at which the switching element Q is turned off in accordance with the analog input signal inputted between points a and b from the output voltage sense circuit 2. In other words, a phase or a time at which the signal of the output terminal c of the signal transmission element 1 transits from a low level to a high level can be controlled by the analog signal inputted between the points a and b. Accordingly, when the analog signal which makes the output voltage $V_0$ of the switching power supply constant is outputted from the output voltage sense circuit 2, in accordance with this signal the phase or the time point at which the switching element Q is turned off can be controlled, and the stabilization of the output voltage $V_0$ is achieved.

In this embodiment, since the signal transmission element 1 is supplied with the analog signal and it outputs from the secondary side of the transformer T an insulated pulse signal obtained by converting the analog signal, it is hardly influenced by a voltage drop across the base-emitter of the transistor $Q_s$ and by non-uniformity of the current amplification factor and the like, and the turning off of the switching element Q can be attained accurately at the time at which the switching element Q is to be turned off. Thus, there is an advantage that the precision of the output of the switching element can be improved.

Figure 2:
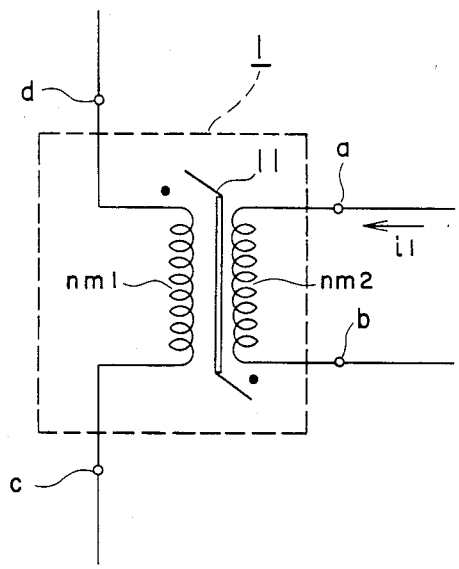
FIG. 2 is a circuit diagram showing an example of a concentrate arrangement of a part of the circuit of FIG. 1.

FIG. 2 shows a detailed circuit arrangement of the signal transmission element 1 shown in FIG. 1. In the Figure, reference numeral 11 designates the saturatable reactor, nm2 designates a winding to which the analog signal from the output voltage sense circuit 2 is applied, and nm1 designates a winding for outputting the pulse signal. At the point a, a signal current $i_1$ is inputted from the output voltage sense circuit 2. The operation of this saturable reactor 11 will be described with reference to a magnetization or hysteresis curve shown in FIG. 3.

Now, supposing that the saturable reactor 11 has been magnetized up to the magnetic field intensity $H_1$ expressed by the following equation in a direction which is positive at the undotted terminal in FIG. 2 by the current $i_1$ inputted between the points a and b:

$$H_1 = \frac{i_1 \cdot N_{nm2}}{l} \quad (1)$$

Figure 3:
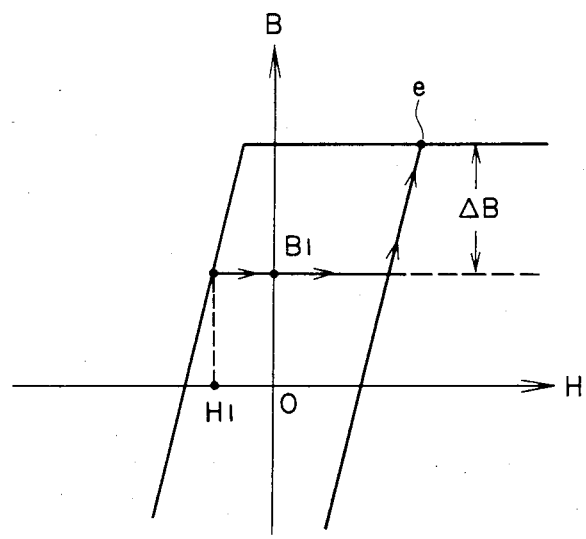
FIGS. 3 and 4 are graphs useful to explain the operation of the embodiment of FIG. 1.

In equation (1), $N_{nm2}$ is the number of turns of the winding nm2, and $l$ is the magnetic path length of the saturable reactor 11. If the negative direction of the magnetic field H in FIG. 3 is taken to represent such a case in which the saturable reactor 11 is magnatized in a direction which is positive at the undotted terminal in FIG. 2, it is considered that the saturable reactor 11 has been magnetized up to $H_1$ in FIG. 3 by the current $i_1$. In this condition, supposing that the switching element Q shown in FIG. 1 is turned on, and a voltage which has the positive polarity at a point d is applied to the winding nm1 in FIG. 2. At this time, the saturable reactor 11 is being magnetized with the positive polarity at the dotted terminal. As a result, the flux density of the saturable reactor 11 which has been magnetized up to the magnetic field strength $H_1$ by the analog current $i_1$ increases from the flux density $B_1$ corresponding to the magnetic field intensity $H_1$ along a path shown by the arrow in FIG. 3. Until the flux density reaches a point e, the permeability ($=dB/dH$) of the saturable reactor 11 is large, and the self-inductance is very large, and an increasing rate of the current flowing from the point d to the point c is negligibly small, and the potential of the point c is substantially zero. However, the flux density reaches the point e, since the permeability is rapidly changed to about zero, the self-inductance of the saturable reactor is also reduced rapidly, and a current which rises rapidly flows from the point d towards the point c, and the potential of the point c transits to a high level. The time $t_b$ required for the flux density to increase from $B_1$ to the point e is expressed by the following equation:

$$t_b = \frac{1}{V_{dc}} \cdot N_{nm1} \cdot S \cdot \Delta B \quad (2)$$

In equation (2), $V_{dc}$ is the voltage applied to the winding nm1, $N_{nm1}$ is the number of turns of the winding nm1, S is the sectional area of the core of the saturable reactor 11, and $\Delta B$ is a width of change of the flux density until the flux density reaches the point e from $B_1$.

The winding nm1 of the saturable reactor 11 blocks the applied voltage for the period $t_b$ expressed by the equation (2) after the voltage is applied between the points d and c, and thereafter, when the permeability decreases rapidly and the saturable reactor 11 is saturated, the current is allowed to flow from the point d towards the point c, and the potential of the point c is caused to transit to the high level thereby to turn off the switching element Q.

As will be seen from the equation (1), when the current $i_1$ supplied from the output voltage sense circuit 2 is changed, the magnetic field intensity $H_1$ shown in FIG. 3 is also changed accordingly. As a result, the flux density corresponding to $H_1$ is also changed, and it is possible to control $\Delta B$ shown in the equation (2). Since the period $t_d$ is also changed in accordance with $\Delta B$, it is possible to control by the current $i_1$ the period $t_b$, that is, the phase or the time at which the switching element Q is turned off. Since as the material of the core of the saturable reactor 11, a material having large permeability is employed, even for a small change in the current $i_1$, $\Delta B$ can be changed to a great extent. For this reason, the signal transmission gain of the saturable reactor is several hundred times as great as that of a photocoupler, and thus, even when the output of the switching power supply is changed slightly, it is possible to control accurately to compensate for this change. Further, as shown in FIG. 2, the windings nm1 and nm2 can be provided without being in contact with each other, and the insulation of both the windings is very easy. Moreover, a current to be supplied to the saturable reactor is equal to several 10 mA or less, and it is very small as compared with the current required for a photocoupler.

Figure 4:
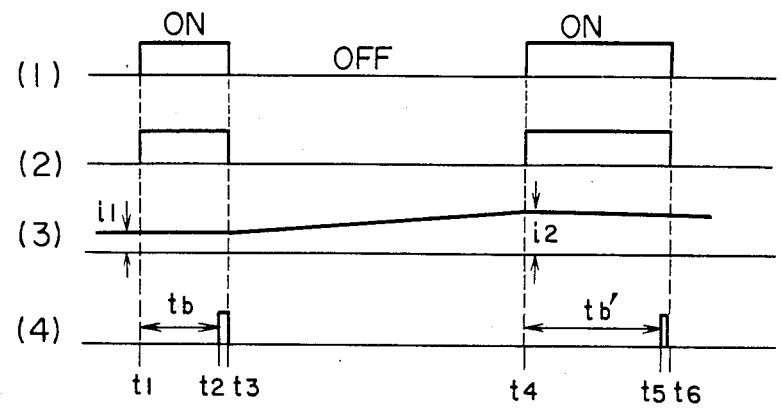

Waveforms at various portions during the aforementioned operation are shown in FIG. 4.

In FIG. 4, the operation of the switching element Q is shown at (1), and it is turned on at a time $t_1$ by a start circuit 4. At (2), the voltage applied to the point d of the signal transmission element 1 is shown, and the voltage is applied at the time $t_1$ in response to the turning on of the switching element Q.

At (3), the analog current supplied between a and b of the signal transmission element is shown, and the current $i_1$ is flowing at the time $t_1$. At this time, the signal transmission element 1 has been mangetized by the current $i_1$ to the magnetic field strength $H_1$ shown by the equation (1), and the flux density has become $B_1$ corresponding to $H_1$ shown in FIG. 3. At the time $t_1$, when the voltage is applied to the point d, the signal transmission element 1 blocks the voltage at the point d for the period $t_b$ shown in the equation (2).

In FIG. 4, at (4), the output voltage of the signal transmission element 1 at the point c is shown. When the period $t_b$ shown in the equation (2) elapses, the signal transmission element 1 is saturated, and the blocking of the voltage at the point d becomes impossible. As a result, the voltage at the point d is applied to the point c at a time $t_2$, and the potentials at the points d and c become substantially equal. When the voltage is applied to the point c, the transistor $Q_s$ is turned on, to cause the switching element Q to be turned off. A period from the time $t_2$ to $t_3$ is a delay time from the signal transmission element 1 is saturated until the switching element Q is turned off, and when the switching element Q is turned off at a time $t_3$, the voltages at the points d and c disappear. During a period from the time $t_3$ to a subsequent turn-on time $t_4$ of the switching element Q, if the analog current inputted to the signal transmission element 1 is increased to $i_2$, the absolute value of the magnetic field intensity $H_1$ shown in the equation (1) is increased and the flux density $B_1$ corresponding to $H_1$ is also changed, and $\Delta B$ shown in the equation (2) becomes large. A period $t_b'$ during which the signal transmission element 1 blocks the voltage at the point d becomes long, and the saturation occurs at a time $t_5$.

As shown in FIG. 4, the signal transmission element 1 is supplied with the analog signal shown at (3), and it outputs the pulse signal shown at (4) and determines the time of turning off the switching element Q.

As described in the foregoing, by using the saturable reactor as a signal transmission element, the signal transmission gain can be made large, and thus an advantageous effect is obtained in which the output of the switching power supply can be controlled with high precision.

Next, with reference to FIG. 1, the operation at various portions for one cycle period of the operation of the switching element Q will be described. Reference numeral 3 designates a control voltage generating circuit which applies a voltage to the point d during a conduction period of the switching element Q upon turning on of the switching element Q, numeral 4 designates the start circuit for turning on the switching element Q again after the switching element Q has been turned off by the pulse signal of the signal transmission element 1.

Now, if the switching element Q is turned on by the operation of the start circuit 4, at this time, the voltage from the control voltage generating circuit 3 is applied to the point d of the signal transmission element 1. The signal transmission element 1 blocks the voltage at the point d for the period $t_b$ shown in the equation (2) by the current supplied between points a and b. Thereafter, since the self-impedance of the signal transmission element 1 decreases rapidly, the voltage applied to the point d is eventually applied across a resistor $R_2$ in FIG. 1, and the potential at the point c rises as a pulse shape to turn on the transistor $Q_s$. Due to the turning on of the transistor $Q_s$, the switching element Q is turned off.

As described above, if the control voltage generating circuit 3 is provided to apply a voltage to the signal transmission element 1 by the turning on of the switching element Q, the period $t_b$ shown in the equation (2) becomes an ON period of the switching element Q, and thus, the ON period of the switching element Q can be designed easily.

When the switching element Q is turned off, it is again turned on after a predetermined period has elapsed by the operation of the start circuit 4. The flux density of the signal transmission element 1 constituted by the saturable reactor reaches the point e shown in FIG. 3 just after the switching element Q is turned off, and it is saturated. If the switching element Q is again turned on with the saturable reactor 11 being still in this condition, the saturable reactor 11 is unable to block the voltage applied to the point d, and the transistor $Q_s$ is instantly turned on to cause the switching element Q to be turned off. As a result, it would be impossible to stabilize the output of the switching power supply. Accordingly, when the switching element Q is turned off, it is necessary to reset the saturated saturable reactor by the analog signal applied between the points a and b before the next turning on of the switching element Q, to thereby make the switching element Q conductive for a required period. In this respect, in order to reset the saturable reactor 11 during the OFF period of the switching element Q, it is indispensable that the control voltage generating circuit 3 applies the voltage to the point d only during the ON period of the switching element Q. In other words, in the present invention, as will be described with reference to FIG. 5, since it is so arranged that the voltage applied to the point d disappears when the switching element Q is turned off, it is possible to reset the saturable reactor 11 by generating a voltage in each of its windings which are positive at the undotted terminals by the current $i_1$ supplied from the output voltage sense circuit 2. More specifically, during the period in which the voltage which is positive at the point d is applied externally, even when the current $i_1$ is supplied to the winding nm2 shown in FIG. 2, it is impossible to generate the voltage which is positive at the undotted terminal in FIG. 2, and thus, it is impossible to reset the saturable reactor 11. Accordingly, the more the disappearance of the voltage applied to the point d by the control voltage generating circuit 3 is delayed after the switching element Q is turned off, the shorter becomes the period available to reset the saturable reactor 11, which gives rise to a possibility that a sufficient time for resetting can not be insured.

In the embodiment, the control voltage generating circuit 3, upon turning off the switching element Q, immediately interrupt the voltage applied to the signal transmission element 1, and thus, there is an advantageous effect that the saturable reactor 11 used in the signal transmission element 1 can be sufficiently reset during the OFF period of the switching element Q.

Figure 5:
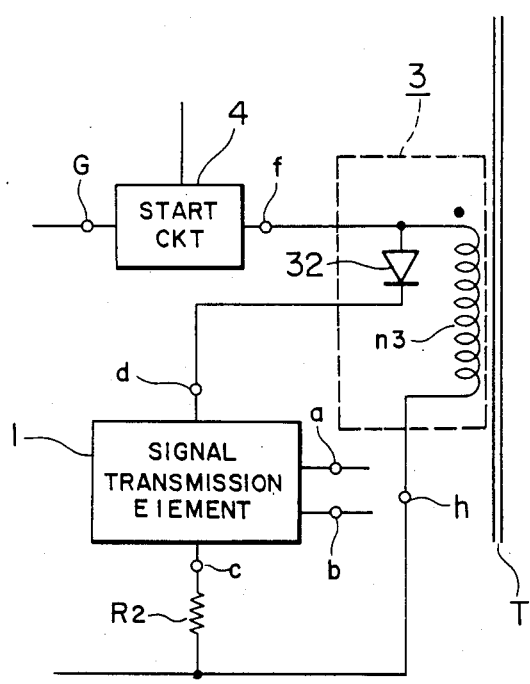
FIGS. 5 and 6 are circuit diagrams respectively showing parts of the circuit of FIG. 1.

In FIG. 5, there is shown an example of a circuit arrangement of the control voltage generating circuit 3. The control voltage generating circuit 3 is composed of a control winding n3 magnetically coupled with the primary winding n1 of the transformer T in FIG. 1, and a diode 32. Further, characters a, b, c, d, f and G used in FIG. 5 designate identical positions with the characters in FIG. 1.

In FIG. 1, when the switching element Q is turned on, a voltage is applied by the DC input source E to the primary winding n1 of the transformer T which voltage is positive at the dotted terminal. As a result of this, a voltage which is positive at the dotted terminal is induced in the control winding n3 shown in FIG. 5, and this induced voltage is applied to the signal transmission element 1 through the diode 32. The signal transmission element 1 by its operation described in the foregoing causes the potential at the point c to transit from the low level to the high level at the time when the main switching element Q is to be turned off. When the main switching element Q is turned off, a voltage which is positive at the undotted terminal and which is caused due to the reset operation of the transformer T is induced in the primary winding n1 of the transformer. Although this voltage is also induced in the winding n3 in FIG. 5, this voltage is not applied to the signal transmission element 1 since it is blocked by the diode 32. Therefore, a period in which the voltage is applied to the signal transmission element 1 from the winding n3 is only the ON period of the switching element Q, and further when the switching element Q is turned off, the voltage applied to the signal transmission element 1 from the control voltage generating circuit 3 becomes 0 V immediately. Thus, a sufficient time for resetting the saturable reactor 11 constituting the signal transmission element 1 can be insured.

Figure 6:
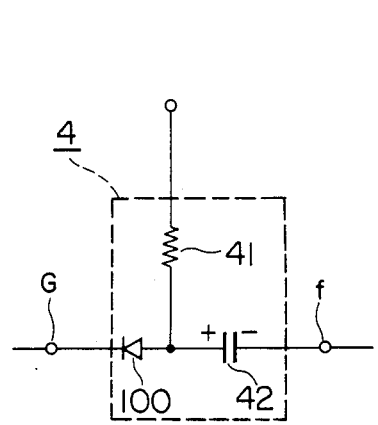

In FIG. 6, an example of a circuit arrangement of the start circuit 4 is shown. The start circuit 4 is composed of a series connection of a resistor 41 and a capacitor 42, and a diode 100 connected to the junction point between the resistor 41 and the capacitor 42. In the Figure, characters f and G designate identical points with the points in FIG. 1. The circuit in FIG. 1 basically operates as a blocking oscillating circuit. Here, the operation of the start circuit 4 will be described. When the DC input source E is applied, a current flows from the source E through the resistor 41 connected to the positive terminal of the DC input source E, the f point in FIG. 1, the control voltage generating circuit 3, and the h point, and the capacitor 42 is charged to the polarity shown in FIG. 6. As the capacitor 42 is charged, the potential of the gate electrode G of the switching element Q connected through the diode 100 to the junction point between the capacitor 42 and the resistor 41 rises and reaches a gate threshold voltage $V_{TH}$. At this time, the switching element Q is turned on, and voltages which are positive at dotted terminals are respectively induced in the winding n1 of the transformer T and the control winding n3 shown in FIG. 5. The gate electrode G of the switching element Q is further biased by the voltage induced in the winding n3, and becomes a conducting condition. That is, the control winding n3, start circuit 4, and control electrode and source electrode of the switching element Q form a positive feedback loop. When the switching element Q is turned on, the signal transmission element 1 generates an output after a predetermined period lapses, and the transistor $Q_s$ shown in FIG. 1 is turned on. When the transistor $Q_s$ is turned on, the capacitor 42 is charged in the opposite direction to the polarity shown in FIG. 6, and is charged rapidly to the output voltage value of the winding n3, and at the same time, the gate electrode G of the switching element Q is caused to be grounded thereby to turn off the switching element Q. When the switching element Q is turned off, the resistor 41 causes again the capacitor 42 to be recharged to the polarity shown in FIG. 6, and when the voltage reaches the threshold voltage $V_{TH}$, the switching element Q is again turned on. As will be apparent from the above operation, a period $t_{off}$ of the turning off of the switching element Q corresponds to the period in which the capacitor 42 charged up to the output voltage of the winding n3 with the positive polarity opposite to that shown in FIG. 6 is again charged to the threshold voltage $V_{TH}$ with the polarity shown in the Figure by current through the resistor 41. Accordingly, the period of $t_{off}$ is expressed by the following equation:

$$t_{off} = R_{41} \cdot C_{42} \cdot \left( \frac{N_{n3}}{N_{n1}} + \frac{V_{TH}}{E} \right) \quad (3)$$

In equation (3), $R_{41}$ and $C_{42}$ are respectively the values of the resistor 41 and capacitor 42, $N_{n3}$ is the number of turns of the winding n3, and $N_{n1}$ is the number of turns of the winding n1. Further in the equation (3), the value of $V_{TH}/E$ is generally equal to 1/5 or less as compared with the value of $N_{n3}/N_{n1}$. Accordingly, a change in the period $t_{off}$ due to a variation in the input source E is small, and a stabilized period of $t_{off}$ can be insured. Since, an ON period $t_{on}$ of the main switching element can be determined by the operation of the signal transmission element 1, a time ratio of the ON period of the main switching element $t_{on}/(t_{on}+t_{off})$ can be controlled, and thus, it is possible to control the output of the switching power supply stably. In this connection, the diode 100 is used to block a flyback voltage generated in the winding n3 of the transformer T due to the turning off of the switching element Q, and to stabilize the charged voltage of the capacitor 42 in the OFF period of the switching element Q.

As described in the foregoing, in the embodiment, since the signal transmission gain of the signal transmission element 1 can be made high, there is an advantageous effect that the output of the switching power supply can be controlled with high precision, and the saturable reactor 11 constituting the signal transmission element 1 can be reset reliably.

Figure 7:
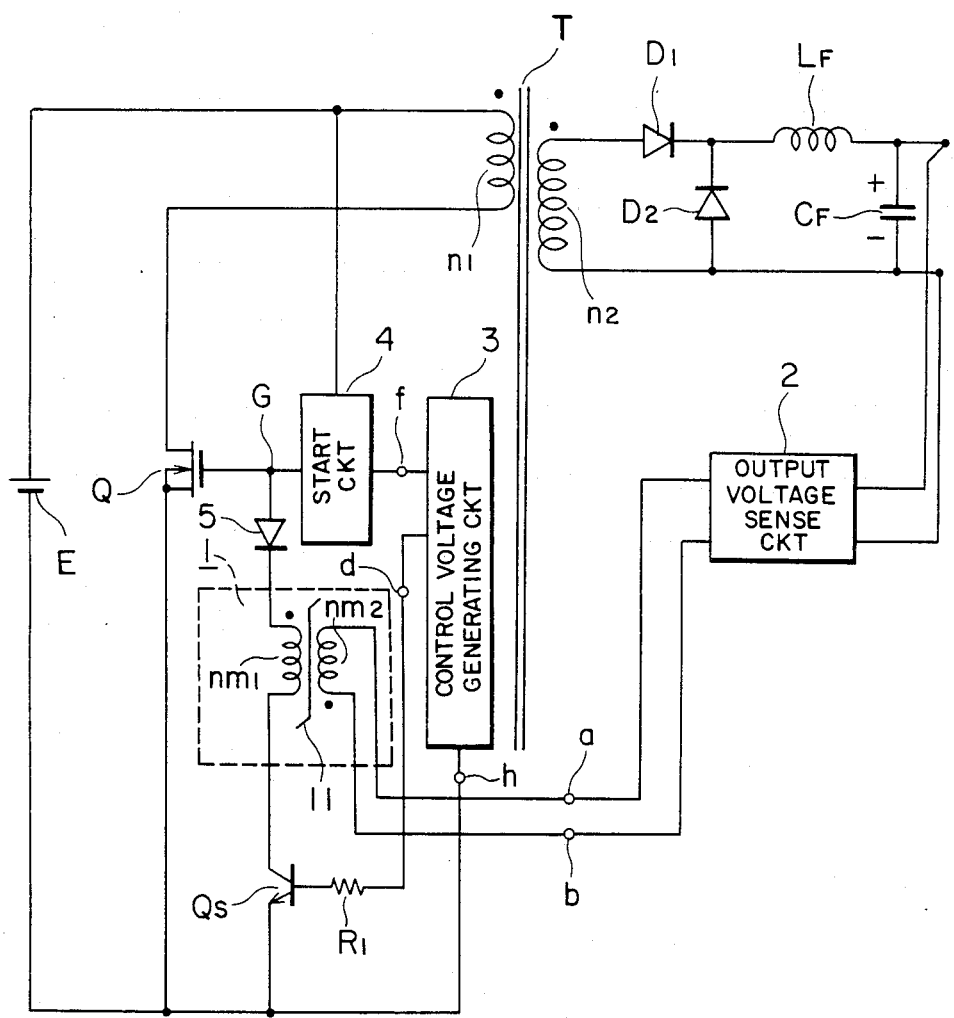
FIG. 7 is a circuit diagram showing another embodiment of the present invention.

FIG. 7 shows another embodiment of the present invention. Like numerals designate like members in FIG. 1, and descriptions thereof are omitted.

In this embodiment, a base current is supplied to the transistor $Q_s$ by a voltage outputted to the point d of the control voltage generating circuit 3 through the base current limiting resistor $R_1$, and the transistor $Q_s$ is turned on. And further, by utilizing a voltage outputted from the point f of the control voltage generating circuit 3, it is so arranged that substantially the same voltage as a bias voltage applied to the gate electrode G of the switching element Q is applied to the winding nm1 of the saturable reactor 11.

In an OFF period of the switching element Q, the capacitor 42 is charged with the polarity shown in FIG. 6 by a DC current which is limited by the resistor 41 which is a constituent element of the start circuit 4. At this time, since the control voltage generating circuit 3 does not generate a voltage at the point d and also at the point f, the transistor $Q_s$ remains in an OFF condition. Since, the resistor 41 generally has a large resistance value for example a hundred kΩ to several ten kΩ, the DC current which passes through this resistor is very small. Thus, assuming that the transistor $Q_s$ is not provided and that the undotted terminal of the winding nm1 is connected directly to the point h of the control voltage generating circuit 3, a current flowing through the resistor 41 would flow through a diode 5 and the winding nm1 of the saturable reactor 11, making it impossible to charge the capacitor 42 to the threshold voltage $V_{TH}$ of the switching element Q with the polarity shown in FIG. 6. As a result, it becomes impossible to turn on the switching element Q by the start circuit 4. However, as in this embodiment, if the transistor $Q_s$ is provided, and if this transistor $Q_s$ is in an OFF condition, the DC current flowing through the resistor 41 charges the capacitor 42, and it is possible to turn on the switching element Q as in the embodiment of FIG. 1. When the switching element Q is turned on, similarly to the embodiment of FIG. 1, the control voltage generating circuit 3 generates voltages at the points f and d, and the gate electrode G of the switching element Q is biased and at the same time, the transistor $Q_s$ is turned on. Due to the turning on of the transistor $Q_s$, the voltage which has been applied to the gate electrode G of the switching element Q is applied to the winding nm1 of the saturable reactor 11 through the diode 5, and this voltage is blocked for the period of $t_b$ shown in the equation (2). When the period of $t_b$ lapses, the saturable reactor 11 is saturated, and since the self-inductance is rapidly decreased, the voltage in the winding nm1 becomes zero, and the potential of the gate electrode G transits from a high level to a low level in a pulse shape thereby to turn off the switching element Q. Due to the turning off of the switching element Q, since the voltages applied to the points f and d by the control voltage generating circuit 3 become substantially 0 V, the transistor $Q_s$ is also turned off, and no voltage is applied to the winding nm1 of the saturable reactor 11 from the control voltage generating circuit 3 until the switching element Q is turned on again by the start circuit 4. The diode 5 is provided so that a reverse voltage from the control voltage generating circuit 3 caused by the reset of the transformer T is not applied to the transistor $Q_s$ and the saturable reactor 11. When the switching element Q is turned off, the saturable reactor 11 is reset to the magnetic field strength of $H_1$ shown in the equation (1) by an analog signal inputted between the points a and b from the output voltage sense circuit 2 in order to make constant the output of the switching power supply.

Also in this embodiment, since the signal transmission gain of the signal transmission element 1 can be made large, there is an advantageous effect that the output of the switching power supply is stalibized with high precision.

Further, although, in the foregoing, an example is described in which a MOSFET is used as the switching element $Q_1$, the present invention can also be applied similarly to a case in which a usual bi-polar transistor is used. In other words, a base current is supplied from the control voltage generating circuit 3 to the bi-polar transistor which has been turned on by the start circuit 4, and the ON condition is maintained. When the output of the signal transmission element is changed at the time when the bi-polar transistor is to be turned off, as will be apparent from the embodiments of FIGS. 1 and 7, the base current is bypassed through the transistor $Q_s$, or a series connection of the winding nm1 of the saturable reactor 11 and the transistor $Q_s$, the base current of the bi-polar transistor is interrupted, thereby turning off the bi-polar transistor.

Figure 8:
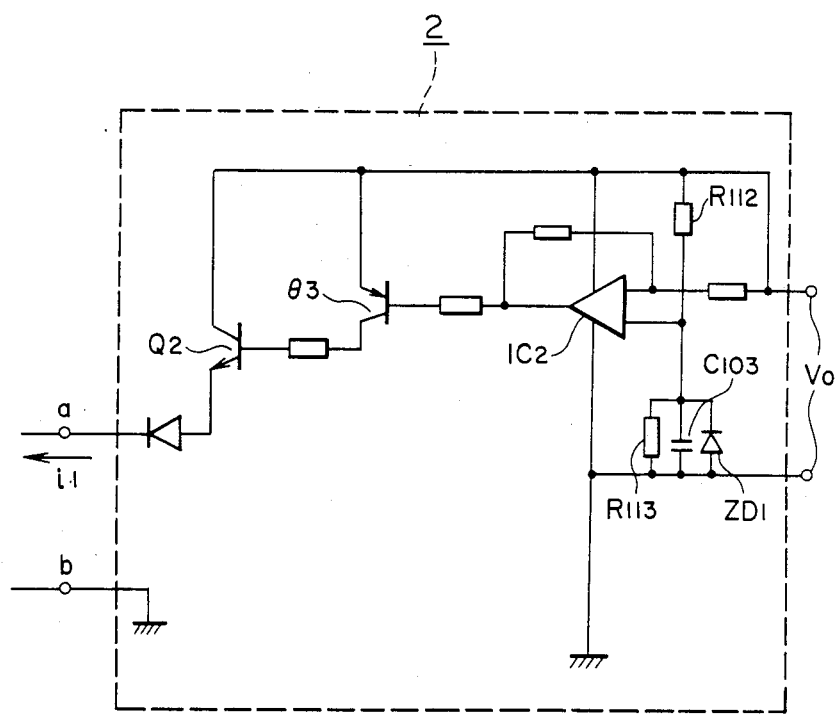
FIG. 8 is a circuit diagram showing a part of the circuits of FIGS. 1 and 7.

In FIG. 8, an example of a circuit arrangement of the output voltage sense circuit 2 is shown. In this circuit arrangement, an $IC_2$ receives as inputs an output voltage $V_0$ of the switching power supply and a volatage of a reference power supply composed of resistors $R_{112}$ and $R_{113}$, a capacitor $C_{103}$, and a Zener diode $ZD_1$, and the $IC_2$ supplies to a transistor $Q_3$ a base current proportional to a difference between the two input voltages. A current corresponding to this base current is supplied to the base of a transistor $Q_2$ from the transistor $Q_3$. As a result, a current corresponding to the difference between the voltage $V_0$ and the voltage of the reference power supply flows from the transistor $Q_2$ through a path including the point a, a reset winding nm2 of the saturable reactor 11, and the point b, and thus the saturable reactor 11 is reset. This output voltage sense circuit is not limited to such a circuit arrangement, and various circuits are available.

With respect to the above example of the embodiment and a prior art power supply using the photocoupler, the precision of the output voltage was actually measured and the comparison was conducted. The results indicate that, when the output voltage of each power supply is controlled to a DC voltage of 5 V, in the case in which the prior art photocoupler is used for the signal transmission element, the stability of the output precision was ±5%, and in the case in which the signal transmission element employing a saturable reactor as in this embodiment was used, the stability of the output precision was ±1%. Thus the stabilization of the output voltage could be achieved and precision five times as high as that of the prior art could be obtained. Furthermore, as compared with the case in which the photocoupler is used, the circuit arrangement is not complicated, and a high output control characteristic can be obtained with a simple arrangement.

According to the above embodiment, since a high signal transmission gain of the signal transmission element can be obtained, there is an advantageous effect that the output of the switching power supply circuit is stabilized with high precision.

Next, another embodiment of the present invention will be described with reference to FIGS. 9 to 12.

In the circuit of FIG. 1 or FIG. 7, there are advantages that a simple circuit arrangement can be employed to control the ON period while maintaining the OFF period constant, and a high output voltage precision is obtained, and an oscillation period is relatively stable, and thus it is sufficient for normal use. On the other hand, this circuit suffers a disadvantage in that no member is provided to limit a maximum value of the ON period, and if an input voltage drop or a rapid load change is large, the ON period becomes excessively long and an excessive current flows through the switching element Q, and further, in order to prevent this, a transformer of a large size is required.

Figure 9:
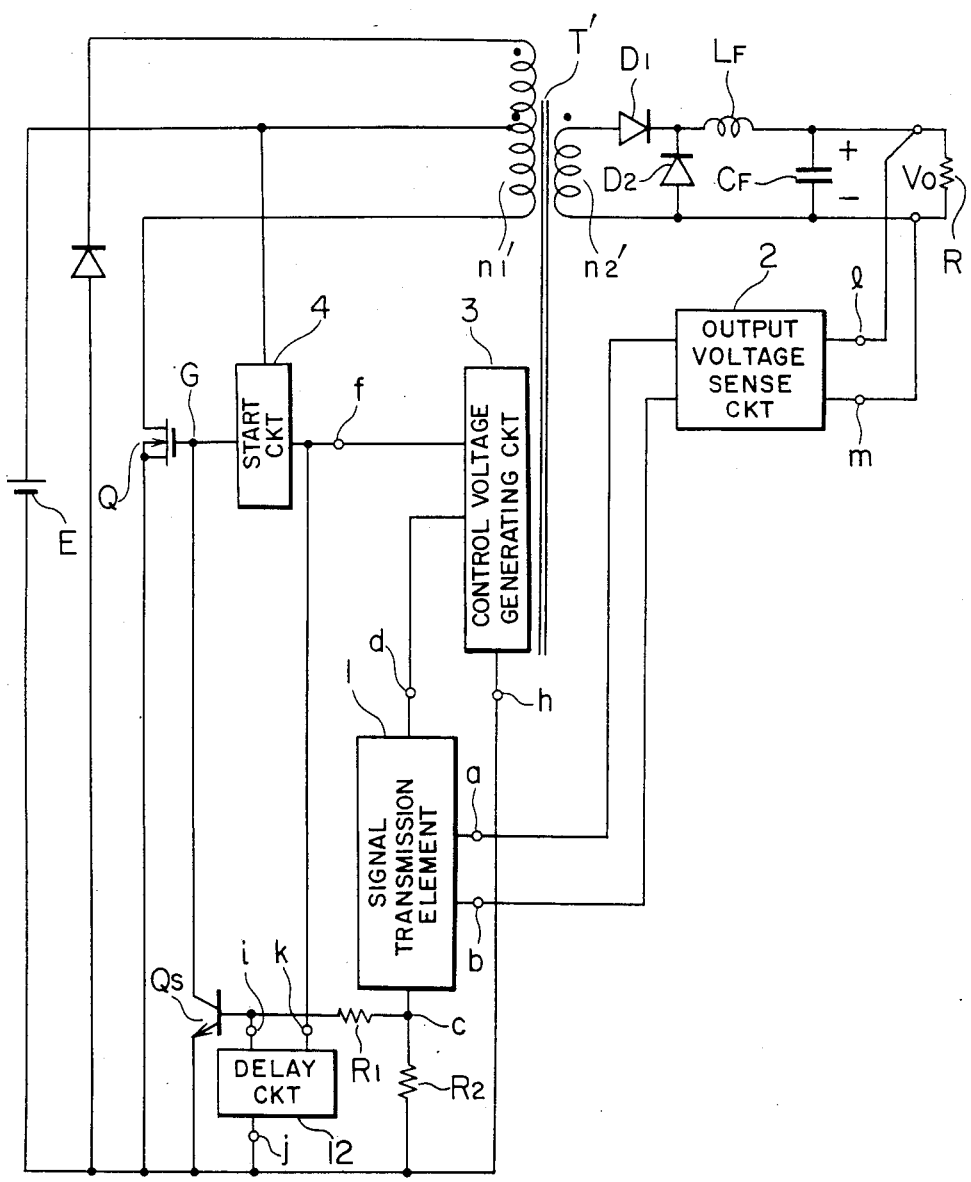
FIG. 9 is a circuit diagram showing another embodiment of the present invention.

The embodiment of FIG. 9 is designed to solve this problem. In FIG. 9, like reference numerals and characters designate like members in FIG. 1. In the Figure, as will be described later, an output terminal i of a delay circuit 12 is connected to the base of the transistor $Q_s$, a common terminal j is connected to the emitter of the transistor $Q_s$, and an input terminal k is connected to the output f of the control voltage generating circuit 3. The circuit arrangement except the delay circuit 12 is almost the same as that of FIG. 1, and thus, firstly, the operation of the circuit will be described hereinafter.

When the DC input voltage E is applied, a current flows through the start circuit 4 and the control voltage generating circuit 3. A voltage at the point G is increased gradually by the start circuit 4, and when the voltage reaches the gate threshold voltage $V_{TH}$ of the switching element Q, the switching element Q begins to be turned on and is actuated. Then, a voltage for turning on the switching element Q is applied to the gate eletrode of the switching element Q from the control voltage generating circuit 3 through the start circuit 4, and the switching element Q is turned on. Next, a current is supplied from the c terminal of the signal transmission element 1 to the base electrode of the transistor $Q_s$ in order to turn off the switching element Q, and the transistor $Q_s$ is turned on. As a result, a voltage between the gate and source electrodes of the switching element Q is decreased and the switching element Q is turned off. After a predetermined time lapses from the turning off of the switching element Q, a voltage for turning on the switching element Q again is applied to the gate electrode of the switching element Q by the start circuit 4, and the switching element Q is turned on after the lapse of an OFF period thereof. By the repetition of this operation, this circuit oscillates.

By switching the element Q on and off repeatedly, a voltage is generated in a primary winding n1' of a transformer T', and a voltage is induced in a secondary winding n2' by the transformer action. The voltage induced in the secondary winding n2' is rectified and smoothed by the action of the diodes $D_1$ and $D_2$, the reactor $L_F$, and the capacitor $C_F$, and the output voltage $V_0$ rectified and smoothed is supplied to a load resistor R.

The output voltage $V_0$ is determined depending on an ON period $t_{on}$ of the switching element Q and an oscillation period $T_{osc}$, and increases or decreases in proportion to $t_{on}/T_{osc}$. In this circuit, since the oscillation is produced with a constant OFF period by the operation of the start circuit 4, the output voltage $V_0$ is determined by the ON period $t_{on}$.

The output voltage sense circuit 2 detects the output voltage $V_0$ at terminals l and m, and compares it with a reference voltage produced within the circuit, and outputs an analog error signal voltage proportional to a difference to the terminals a and b. This voltage is inputted to the signal transmission element 1.

Figure 10:
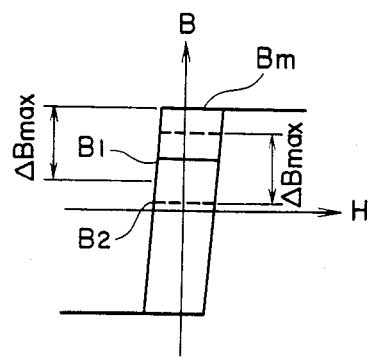
FIG. 10 is a graph useful to explain the embodiment of FIG. 9.

The saturable reactor 11 constituting the signal transmission element 1 exhibits a rectangular magnetic characteristic as shown in FIG. 10, and alters a time required to transit from a high impedance condition to a low impedance condition based on the product of a voltage inputted between the terminals a and b and a time of application of the voltage, that is, the so-called voltage-time product. This time is determined by a voltage-time product which is the product of the voltage inputted to the saturable reactor 11 during an OFF period in the previous ON-OFF cycle and a time of application of the voltage. When the inputted voltage-time product is large, a long time is required until the impedance condition at the terminals d and c changes, and when the voltage-time product is small, this time becomes short. Since the OFF period of the switching element Q is constant as described in the above, the time which can be altered by the saturable reactor 11 is dependent only on the voltage inputted between the terminals a and b.

When the impedance between the terminals d and c of the saturable reactor 11 is changed from a high condition to a low condition, the control voltage generating circuit 3 supplies a base current to the transistor $Q_s$ from the terminal c to turn on the transistor $Q_s$. As a result of this, the switching element Q is turned off. In other words, the ON period of the switching element Q is changed by the error signal between the output voltage and the reference voltage. By arranging the output voltage sense circuit 2 to output the error singal voltage so that the output voltage $V_0$ is maintained constant, it is possible to obtain the output voltage as a desired stable DC voltage. The so-called feedback control operation takes place.

The operation described above is similar to that in FIG. 1.

In the circuit of FIG. 9 which operates as described in the foregoing, for example, when the load is increased rapidly, the output voltage $V_0$ decreases. A voltage for compensating for the descrease of the output voltage is inputted to the signal transmission element 1 by the output voltage sense circuit 2. However, an error detection voltage exhibits a transient response due to a transient response characteristic of the output voltage sense circuit 2, and the error detection voltage increases temporarily excessively. And, during this time, the ON period of the switching element Q becomes excessively large.

The transformer T' is required to be reset by applying the same voltage-time product as the voltage-time product during the ON period of the switching element Q to the transformer T'. In this circuit, since the OFF period is constant, the ON period must be equal to a predetermined period or less for the reason mentioned above. The ON period of the switching element Q is limited also by a tolerance value in the design of the ON period of the transformer T' which is determined by a maximum flux saturation density. When the ON period of the switching element Q exceeds a limit of the design tolerance value of the transformer T', the transformer T' is saturated, and an excessively large drain current flows through the switching element Q resulting in breakage thereof.

This will be described based on the magnetic characteristic of the saturable reactor 11 shown in FIG. 10. During the OFF period of the switching element Q in usual operation, the flux density of the saturable reactor 11 varies from $B_m$ to $B_1$ depending on the voltage-time product inputted to the saturable reactor 11. In other words, supposing that the change width $B_m - B_1$ is $\Delta B$, the input voltage of the saturable reactor is $V_{ab}$, and the proportional constant determined by the shape of the saturable reactor and the number of turns of its winding nm2 is K, then $\Delta B$ is expressed by:

$$\Delta B = K \cdot V_{ab} \cdot t_{off}$$

Supposing that $\Delta B_{max}$ is the change width of the flux density determined by an allowable maximum ON period $t_{on\ max}$ of the switching element Q, the change width $\Delta B$ must be equal to $\Delta B_{max}$ or less. However, when the inputted voltage $V_{ab}$ is increased and the flux density reaches a point $B_2$ in FIG. 10 as a result of a rapid increase of the load and a decrease of the output voltage $V_0$, the next ON period will be a time required for the flux density to change from $B_2$ until $B_m$ is reached. Thus, $\Delta B$ exceeds $\Delta B_{max}$, and the ON period $t_{on}$ exceeds the maximum ON period $t_{on\ max}$, which is dangerous.

In this embodiment, the ON period of the switching element Q is prevented from being increased excessively by providing a measure for retaining the amount of change $\Delta B$ in the flux density of the saturable reactor 11 within $\Delta B_{max}$. More specifically, a signal is generated after a predetermined time from the turning on of the switching element Q, and by utilizing this singal, the transistor $Q_s$ is turned on and the switching element Q is forcibly turned off. Consequently, even when a large voltage-time product is inputted to the saturable reactor 11, it is possible to retain the amount of change $\Delta B$ within $\Delta B_{max}$.

Next, a concrete example for realizing this measure will be described.

Figure 11:
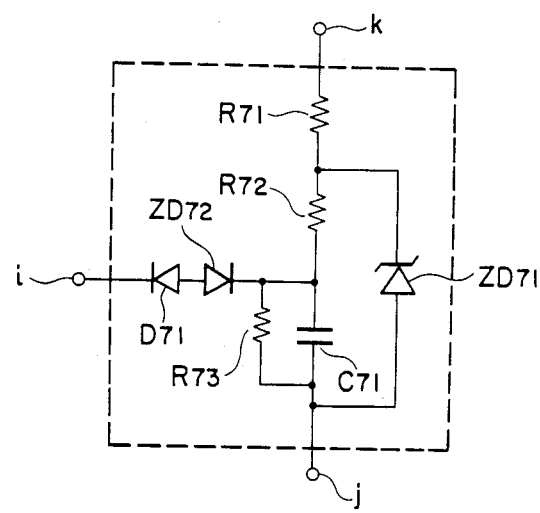
FIGS. 11 and 12 are circuit diagrams respectively showing examples of concrete circuit arrangements of parts of FIG. 9.

In FIG. 11, an example of the delay circuit for determining the maximum value $\Delta B_{max}$ of the flux density of the saturable reactor 11 is shown. When the switching element Q is turned on, a voltage is applied to a point k by the control winding n3, and a constant voltage is obtained by a resistor $R_{71}$ and a Zener diode $ZD_{71}$, and a capacitor $C_{71}$ is charged through resistors $R_{72}$ and $R_{73}$. When the charged voltage rises and reaches a voltage to make a Zener diode $ZD_{72}$ conductive, a current flows from an i terminal, and the transistor $Q_s$ in FIG. 9 is turned on. Various circuit arrangements are possible for generating a signal after a predetermined period lapses, and it is apparent that similar effects can be obtained.

Figure 12:
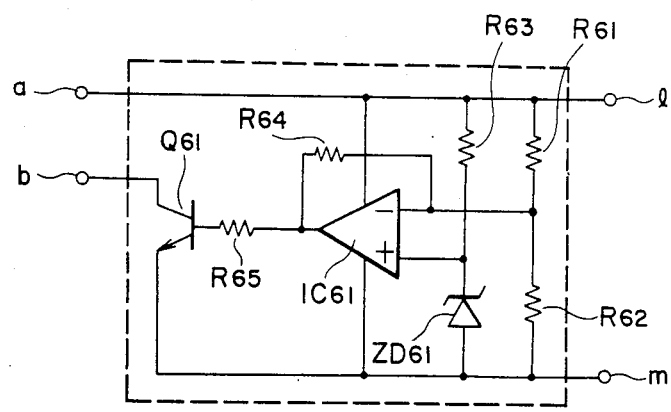

Next, in FIG. 12, another example of the circuit arrangement of the output voltage sense circuit 2 is shown. In the Figure, the output voltage supplied to terminals l and m is divided by resistors $R_{61}$ and $R_{62}$, and the divided voltage is compared in an $IC_{61}$ with a reference voltage obtained by a resistor $R_{63}$ and a Zener diode $ZD_{61}$. The resultant error voltage is further amplified by an amplifier circuit within the $IC_{61}$ and by a transistor $Q_{61}$, and inputted to the input terminals a and b of the saturable reactor 11. A resistor $R_{65}$ limits a base current of the transistor $Q_{61}$, and the resistors $R_{64}$ and $R_{61}$ determines the voltage amplification factor of the $IC_{61}$.

Figure 13:
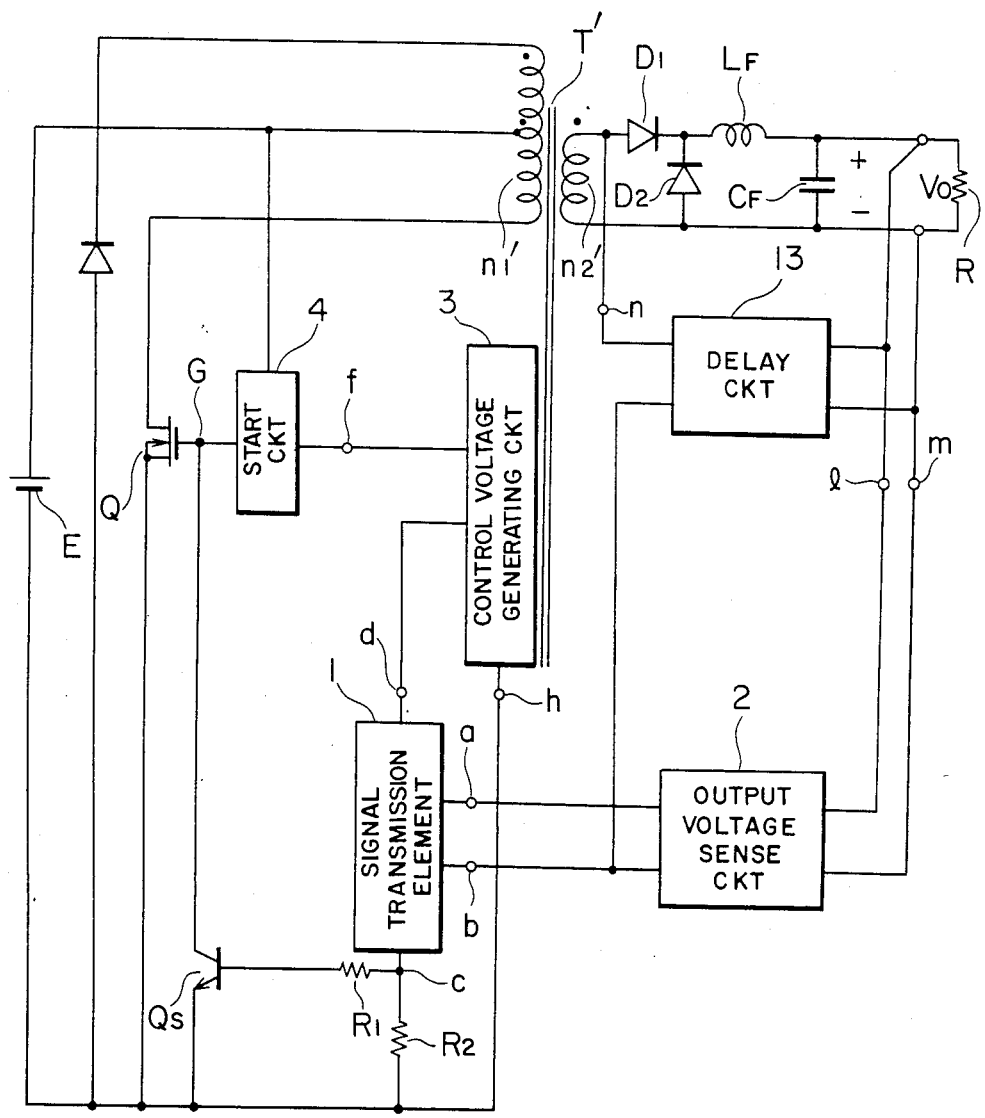
FIG. 13 is a circuit diagram showing another embodiment of the present invention.

FIG. 13 is a circuit diagram showing another embodiment of the present invention. Like reference numerals and characters designate like members in FIGS. 1 and 9, and descriptions thereof are omitted.

In this circuit, a delay circuit 13 for determining a maximum value of the flux density of a saturable reactor 11 is provided in the secondary side of the transformer T'. The delay circuit 13 detects an ON condition of the switching element Q at terminals n and m, and after a predetermined time lapses from the turning on of the switching element Q, applies an output voltage $V_0$ to the terminals a and b of the saturable reactor 11. Accordingly, the transistor $Q_s$ is turned on and the switching element Q is turned off.

Figure 14:
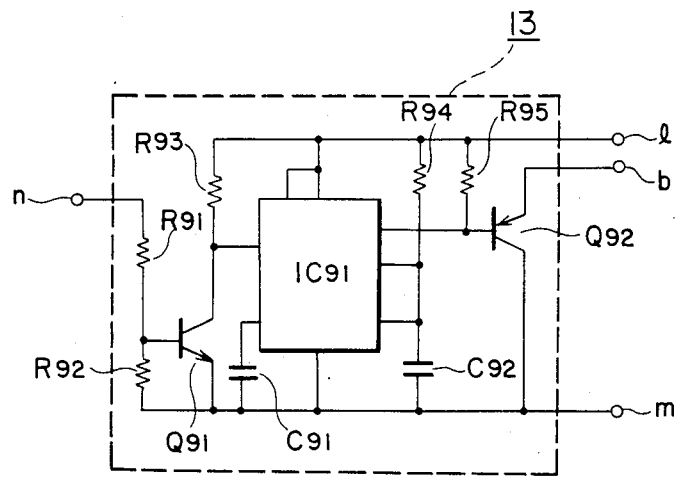
FIG. 14 is a circuit diagram of an example of a concrete circuit arrangement of a part of FIG. 13.

FIG. 14 shows an example of a concrete circuit of the delay circuit 13. The operation of the embodiment of FIG. 13 will be described also with reference to FIG. 14.

An $IC_{91}$ is a timer IC such as a HA17555 of Hitachi, Ltd. or NE555 of Signetics or the like. These ICs are well known, and detailed description of the operation is omitted. In FIG. 13, when the switching element Q is turned on, a voltage is induced in each winding of the transformer T' which are positive at the dotted terminals as shown in the Figure. At this time, due to the voltage induced in the winding n2, a current flows through a path including a point n, the base of a transistor $Q_{91}$, and the point m, and the transistor $Q_{91}$ is turned on. When the transistor $Q_{91}$ is turned on, the $IC_{91}$ outputs to the base of a transistor $Q_{92}$ a signal of a high level for a period determined by a constant determined by a resistor $R_{94}$ and a capacitor $C_{92}$, and the transistor $Q_{92}$ is made to be an OFF condition. When the period determined by the resistor $R_{94}$ and the capacitor $C_{92}$ lapses, the output signal of the $IC_{91}$ transits to a low level to thereby turn on the transistor $Q_{92}$. Since the points b and m are short-circuited due to the turning on of the transistor $Q_{92}$ (and since the points 1 and a are directly connected as shown in FIG. 12), a current flows from the point a through the winding nm2 connected between the points a and b of the saturable reactor 11 (FIG. 2). This current causes a current to flow from the point d through the winding nm1 (of the saturable reactor 11) connected between the points d and c in accordance with the ratio of the winding nm2 to the winding nm1, and thus a current flows through the winding n3 in FIG. 5, diode 32, point d, point c, and resistor $R_1$ to the base of the transistor $Q_s$ thereby to turn on the transistor $Q_s$.

In the operation described above, it is possible to determine, by the values of the resistor $R_{94}$ and the capacitor $C_{92}$, a period from the turning on to the turning off of the switching element Q so that this period is equal to a predetermined value or less.

As in this embodiment, when the delay circuit is provided in the secondary side of the transformer, the primary side circuit can be simplified, and it is very advantageous to comply with various safety standards or requirements.

As described in the foregoing, in the embodiments of FIGS. 9 and 13, as a countermeasure to a transient response in the control at the time of start and stop of the switching power supply, and rapid variation in load, or the like, a maximum value of the ON period is limited to a period which does not cause saturation of the main transformer. Thus, there is an advantageous effect that a safe self-oscillating operation can be obtained. Further, another advantageous effect is that there is no need to increase the size of the transformer for the purpose of preventing the saturation.

Figure 15:
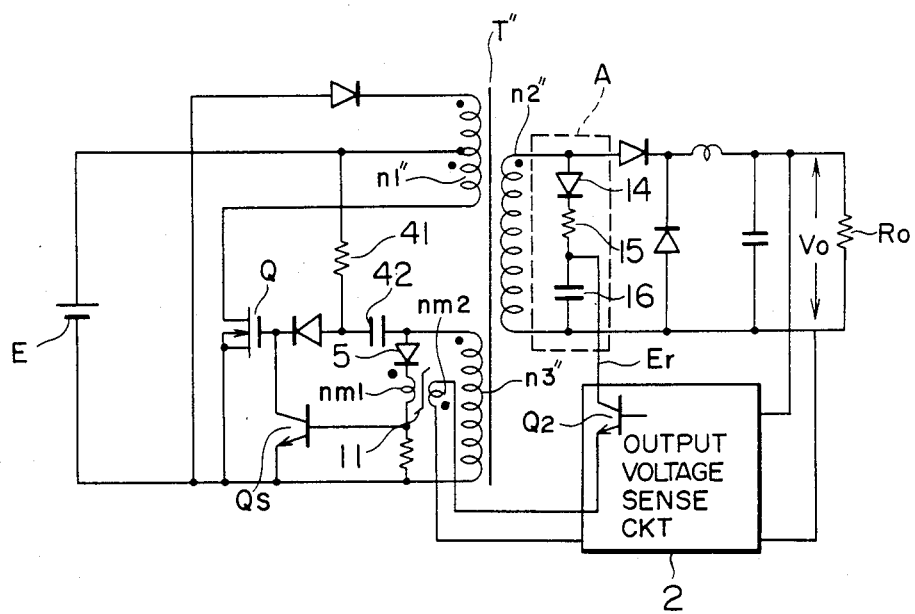
FIG. 15 is a circuit diagram showing another embodiment of the present invention.

FIG. 15 shows a circuit diagram of another embodiment of the present invention.

As described in connection with the embodiment of FIG. 9, in the switching power supply in the embodiment of FIG. 1, it is necessary to increase the size of the transformer to cope with a variation of the input power supply, rapid change in load, or the like. The embodiment of FIG. 15 provides a solution of this problem in a different way from the embodiments of FIGS. 9 and 13.

Figure 16:
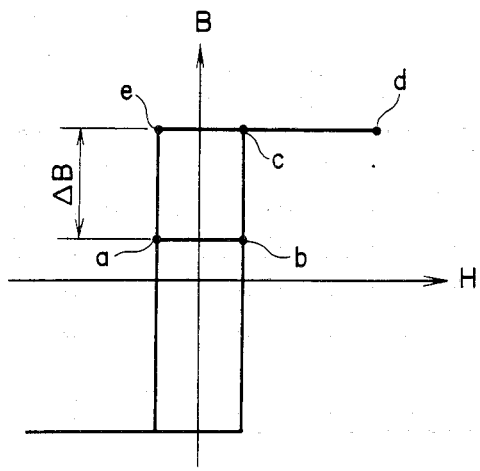
FIGS. 16 and 17 are graphs useful to explain the circuit of FIG. 15.
Figure 17:
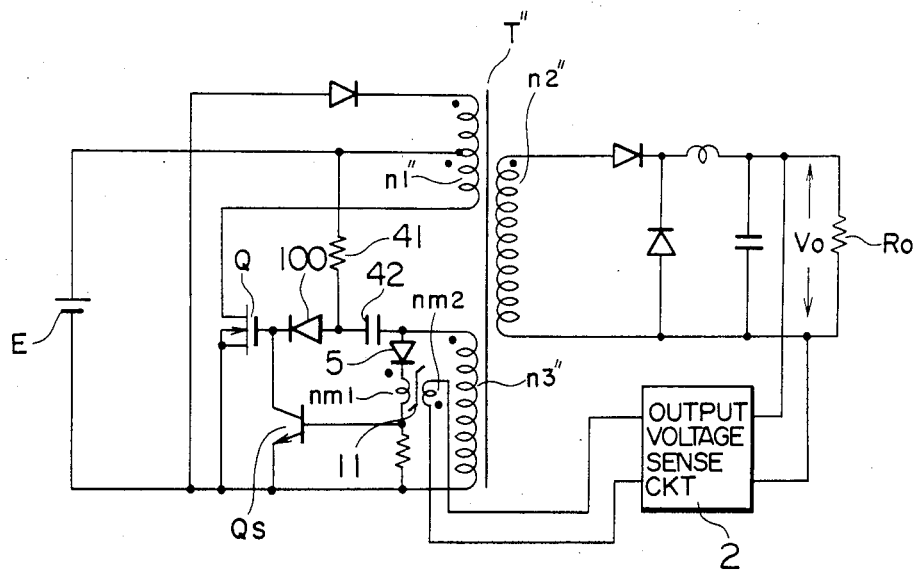

In order to easily understand the embodiment of FIG. 15, firstly, a circuit of FIG. 17 whose arrangement is substantially similar to the embodiment of FIG. 1 will be described with reference also to FIG. 16 showing a B-H characteristic of a saturable reactor. In FIG. 17, like reference numerals and characters refer to like members in FIG. 1 and descriptions thereof are omitted.

In FIG. 17, the reference numerals 41 and 42 designates the resistor and the capacitor for determining an OFF period of the switching element Q, and a voltage is applied to the gate electrode of the switching element Q by a current flowing from the input DC source E through the resistor 41.

As a result, when the switching element Q is turned on, a current flows in a primary winding n1" of a transformer T", and a voltage is induced in a control winding n3" in accordance with a voltage applied to the primary winding n1" and the ratio of the number of turns of the primary winding n1" to the number of turns of the control winding n3". This voltage charges the capacitor 41, and since the gate electrode of the switching element Q is applied with the voltage, the switching element Q is rapidly saturated by the positive feedback action.

At the same time, the induced voltage in the control winding n3" is also applied to the saturable reactor 11. When the saturable reactor 11 is in a non-saturated condition, since the current flowing to the base electrode of the transistor $Q_s$ is almost zero and negligible, the transistor $Q_s$ is in an OFF condition, and the switching element Q is held in the ON condition.

Some time later, when the saturable reactor 11 is saturated, since the current flowing in the base electrode of the transistor $Q_s$ increases rapidly, the transistor $Q_s$ is turned on to make the switching element Q turn off. As a result, the current in the winding n1" is interrupted, and consequently, the voltage of the control winding n3" and the current in the saturable reactor 11 become zero. In this manner, since the transistor $Q_s$ becomes off and returns to the initial condition, the gate of the switching element Q is biased with the voltage of the power source E and the Q becomes ON condition.

The above operation is repeated in the same way, and the switching element Q repeats the ON and OFF operations. The DC output voltage $V_0$ is obtained by rectifying and smoothing a voltage generated in the secondary winding n2" due to the ON and OFF operations of the switching element Q.

Here, the ON period of the switching element Q is substantially determined by a time required for the saturable reactor 11 to transit from the non-saturated condition to the saturated condition. The operation in an ideal condition will be described with reference to the B-H curve of the saturable reactor shown in FIG. 16.

In FIG. 16, supposing that an initial value of the flux density is represented at a point a, in the ON period of the switching element Q, the flux density of the core of the saturable reactor 11 changes from the a point→b point→c point. The path between the points b and c is in the non-saturated condition, and the saturable reactor 11 blocks a current. When the saturable reactor 11 is saturated at the point c, the current flowing in the saturable reactor 11 increases rapidly, and the saturable reactor 11 is magnetized up to a point d, and the transistor $Q_s$ is turned on, and the switching element Q is turned off.

Thereafter, a current is supplied to the second winding nm2 of the saturable reactor 11 by the operation of the output voltage sense circuit or control circuit 2, and the flux density of the core of the saturable reactor 11 is changed through the points d→e→a, and one cycle is completed.

Supposing that the amount of change of the flux density from the point a to the point d is $\Delta B$, the ON period of the switching element Q is $t_{on}$, the number of turns of the first winding nm1 of the saturable reactor 11 is $N_{nm1}$, and the sectional area of the core of the saturable reactor 11 is $A_c$, then the relationship between $\Delta B$ and $t_{on}$ is expressed by the following equation:

$$t_{on} = \frac{1}{V_2} \cdot N_{nm1} \cdot A_c \cdot \Delta B \tag{4}$$

Where, $V_2$ is the voltage generated in the control winding n3 during the ON period of the switching element Q. Accordingly, by controlling $\Delta B$ by the output voltage sense circuit or control circuit 2, it is possible to change the ON period $t_{on}$.

The output voltage sense circuit 2 in FIG. 17 detects the output voltage $V_0$, and controls the voltage applied to the second winding nm2 of the saturable reactor 11. As the output voltage sense circuit 2, the circuits shown in FIGS. 8 and 12 may be used.

More specifically, when the output voltage $V_0$ is higher than a target value, $\Delta B$ is decreased by decreasing the voltage applied to the second winding nm2 of the saturable reactor 11 thereby to reduce the ON period $t_{on}$. Conversely, when the output voltage $V_0$ is lower than the target value, $\Delta B$ is increased by increasing the voltage applied to the second winding nm2 of the saturable reactor 11 thereby to increase the ON period $t_{on}$.

For example, supposing that the output voltage $V_0$ is lowered due to a rapid increase of the load, a decrease of the input voltage, or the like, the output voltage sense circuit 2 increases the voltage applied to the second winding nm2 of the saturable reactor 11 in order to maintain the output voltage $V_0$, and increases to the ON period of the switching element Q by increasing a reset amount, i.e., $\Delta B$.

However, in the switching power supply of FIG. 17, when excessive resetting of the saturable reactor occurs due to a transient response of the control circuit or the output voltage sense circuit, the ON period of the switching element becomes excessively long, giving rise to a possibility that the transformer is saturated and the breakage of the switching power supply is caused. To avoid this, a sufficiently large transformer must be used.

This embodiment was made based on the recognition of the following facts:
(1) When the ON period is controlled by using the saturable reactor, the flux density of a saturable core used is determined by the product of a voltage applied and a time.
(2) The flux density (point a in FIG. 16) of the reset saturable core is determined by the product of a voltage applied to the saturable reactor during the OFF period of the main transistor Q, that is, a reset voltage and the OFF period.
(3) The next ON period is determined by the flux density (point a) mentioned above and a voltage applied to the saturable reactor during the ON period of the switching element Q.
(4) Accordingly, the next ON period of the switching element Q is dependent on the voltage applied to the saturable reactor during the ON period of the switching element Q, and the reset voltage applied during the OFF period. In other words, the ON period can also be controlled by a condition for the reset voltage.

Hereinafter, the embodiment will be described in detail with reference to the drawings. FIG. 15 is a circuit diagram showing an arrangement of the embodiment, and in the Figure, like reference numerals and characters designate like members in FIG. 17.

A voltage source A is constituted by a series circuit of a diode 14, a resistor 15, and a capacitor 16 connected to the winding n2. The control transistor Q2 connected between the second winding nm2 of the saturable reactor 11 and the voltage source A is controlled with respect to its conduction (internal impedance) by the output voltage sense circuit 2. The output voltage of the voltage source A is, as will be described later, proportional to an input DC source voltage, and thus, a maximum output voltage of the output voltage sense circuit 2 is limited to a value which is proportional to the voltage of the input DC source.

As described in the foregoing, for example, supposing that the output voltage $V_0$ is decreased for some reasons, the output voltage sense circuit 2 controls to make longer the ON period of the switching element Q in order to maintain the output voltage $V_0$ constant.

In other words, the output voltage sense circuit 2 operates to decrease the collector-emitter voltage of the transistor $Q_2$ (i.e., an internal impedance of the transistor $Q_2$) in order to increase the voltage applied to the second winding nm2 of the saturable reactor 11.

The second winding nm2 of the saturable reactor 11 is applied with a difference voltage between the voltage of the voltage source A and the collector-emitter voltage of the transistor $Q_2$. An initial value (point a) of the flux density of the saturable reactor is determined by an applied voltage-time product, that is, the product of a reset voltage and an OFF period.

Accordingly, in this embodiment, the ON period becomes maximum in such a condition in which the transistor $Q_2$ is saturated, and a reset voltage is applied to a maximum extent.

As is well known, in this type of switching power supply, the transformer T'' (i.e., the core) also requires a reset period as is needed for the saturable reactor. Therefore, in order to limit the voltage applied to the switching element Q to about two times the DC input voltage in consideration of the dielectric strength characteristic of the switching element Q, it is desired to control so that the ON period of the switching element Q does not become longer than the OFF period thereof.

In other words, even when in a condition in which the transistor $Q_2$ is saturated and a maximum reset voltage is applied, it is necessary that the ON period of the switching element Q does not exceed the OFF period.

Next, the condition of this operation will be described.

First, considering the ON period of the switching element Q, in the equation (4), a voltage $V_2$ generated in the winding n3 during the ON period of the switching element Q is expressed by the following equation (5).

$$V_2 = E_i \cdot \frac{N_{n3}}{N_{n1}} \tag{5}$$

where, $N_{n1}$ and $N_{n3}$ are respectively the numbers of turns of the windings n1 and n3.

Now, when the oscillation period is represented by $T_{osc}$, the condition in which the ON period is not longer than the OFF period is expressed by the following equation (6).

$$t_{on} \leq \frac{T_{osc}}{2} \tag{6}$$

Substituting the equations (4) and (5) in the equation (6), the condition of the ON period is established as in the following equation:

$$\frac{T_{osc}}{2} \geq \frac{N_{n1}}{E_i \cdot N_{n3}} \cdot N_{nm1} \cdot A_e \cdot \Delta B \tag{7}$$

where, $N_{nm1}$ is the number of turns of the winding nm1.

Next, the OFF period of the switching element Q, that is, a period in which the saturable reactor is reset will be considered. The voltage $E_r$ of the voltage source A is obtained by rectifying and smoothing the crest value of a voltage generated in the secondary winding n2 of the transformer T", and thus, it is substantially expressed by the following equation (8):

$$E_r = E_i \cdot \frac{N_{n2}}{N_{n1}} \quad (8)$$

where, $N_{n2}$ is the number of turns of the winding n2.

Supposing that the switching element Q is saturated, and the whole of the voltage $E_r$ of the voltage source A is applied to the secondary winding nm2 of the saturable reactor, the reset condition of the saturable reactor is expressed by the following equation (9):

$$\frac{T_{osc}}{2} = \frac{N_{n1}}{E_i \cdot N_{n2}} \cdot N_{nm2} \cdot A_c \cdot \Delta B \quad (9)$$

where, $N_{nm2}$ is the number of turns of the winding nm2.

Accordingly, from the conditions of the equations (7) and (9), the condition of the following equation is obtained:

$$\frac{N_{n3}}{N_{n2}} \gtreqqless \frac{N_{nm1}}{N_{nm2}} \quad (10)$$

The equation (10) represents the condition in which the ON period does not exceed the OFF period, that is, the condition for preventing the saturation of the transformer T"'.

In this respect, in the equation (10), although the condition for making the ON period equal to the OFF period or less is applied, it is apparent that the same advantageous effect can be obtained even by other conditions by changing the set conditions.

In other words, for example, when the dielectric strength of the switching element Q is sufficiently high, in place of $T_{osc}/2$ in the equations (7) and (9) described in the foregoing, a value (e.g., $\frac{2}{3} T_{osc}$) larger than that may be selected, whereas when the dielectric strength is low, a much smaller value must be selected.

Figure 18:
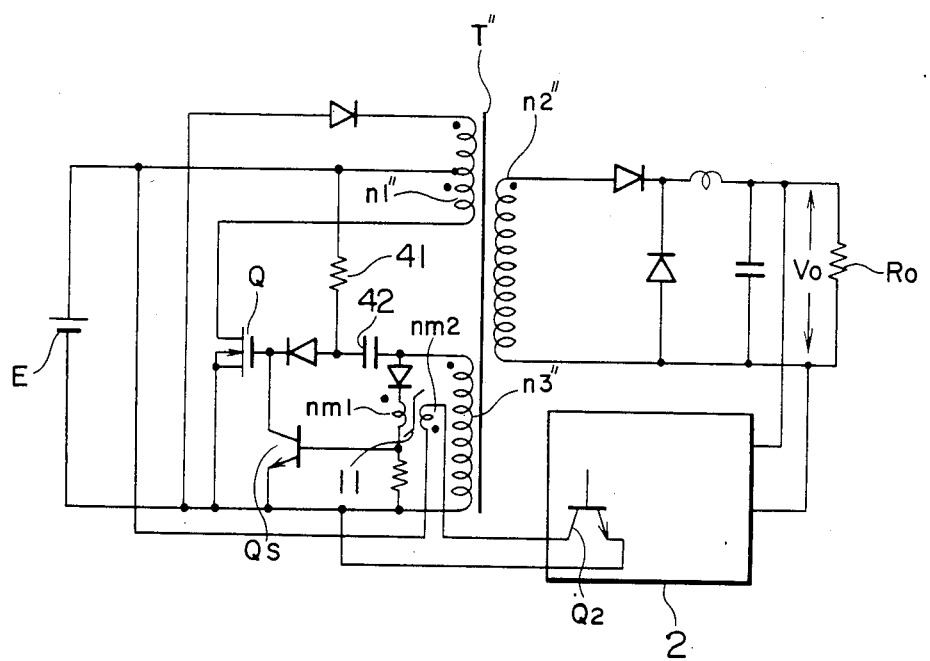
FIG. 18 is a circuit diagram showing another embodiment of the present invention.

Next, another embodiment is shown in FIG. 18. Like reference numerals and characters designate like members in FIG. 15.

This circuit differs from the embodiment of FIG. 15 in that a voltage source for applying the reset voltage to the saturable reactor is obtained directly from the input voltage.

The operation of this circuit is similar to the embodiment of FIG. 15, and when the structure between the primary and secondary sides of the transformer is the non-insulating type, it is possible to employ a circuit arrangement as shown in this example.

In accordance with the embodiment, it is possible to prevent the ON period of the switching transistor from becoming excessively large and to avoid the saturation of the transformer with a simple circuit arrangement including a small number of components. Thus, there is an advantageous effect that a switching power supply with high reliability can be obtained by using a transformer of a small size.

While this invention has been described with reference to illustrative embodiments, this description is not intended to be construed in a limiting sense. Various modifications to the illustrative embodiments, as well as other embodiments of the invention, will be apparent to persons skilled in the art upon reference to this description. It is therefore contemplated that the following claims will cover any such modifications or embodiments that fall within the true scope of the invention.

We claim:

1. A switching power supply comprising:
   a transformer having at least a primary winding connected to an input DC source, a secondary winding, and a control winding;
   first switching means having a first control electrode and connected in series to said primary winding for controlling application of said input DC source to said primary winding;
   rectifying and smoothing means connected to said secondary winding for generating a DC output by rectifying and smoothing an output of said secondary winding;
   starting means connected to said first control electrode for starting said first switching means to close after a predetermined time from a time point when said first switching means is opened, said starting means including a resistor having one end connected to receive a voltage of said input DC source, a capacitor having one end connected to the other end of said resistor and having a second end connected to receive a voltage induced in said control winding, a junction point between said resistor and said capacitor being connected to said first control electrode, said predetermined time being proportional to a time constant determined by said resistor and said capacitor, said control winding and said first control electrode forming a positive feedback loop to ensure complete closing of said first switching means when closing of said first switching means is initiated;
   second switching means connected to said first control electrode for opening said first switching means, said second switching means including a diode and a saturable reactor having a first winding connected through said diode to receive an output of said control winding when said first switching means is closed and a second winding; and
   output voltage sensing means connected to receive said DC output for generating an analog signal representing a difference between said DC output and a predetermined reference signal, said analog signal being applied to said second winding from said output voltage sensing means so that said saturable reactor magnetized by the control winding output during the closure of said first switching means is reset to a value corresponding to said analog signal,
   wherein said second switching means drives said first control electrode to open said first switch means based on a transition of impedance of said saturable reactor occurring when said saturable reactor becomes saturated upon elapse of a period of time corresponding to a level of said analog signal from a time point at which said first switching means is closed.

2. A switching power supply according to claim 1, wherein said first switching means includes a first transistor having two first main electrodes connected in series to said primary winding and having said first control electrode, and said second switching means includes a second transistor having two second main electrodes respectively connected to said first control electrode and one of said two first main electrodes and having a second control electrode, said second control electrode being connected through said first winding to receive a voltage of said control winding.

3. A switching power supply according to claim 1, wherein said first switching means includes a first transistor having two first main electrodes connected in series to said primary winding and having said first control electrode, and said second switching means includes a second transistor having two second main electrodes respectively connected to said first control electrode and one of said two first main electrodes and having a second control electrode connected to receive a voltage induced in said control winding, said first winding being connected in series to said two second main electrodes.

4. A switching power supply comprising:
a transformer having at least a primary winding connected to an input DC source, a secondary winding, and a control winding;
first switching means having a first control electrode and connected in series to said primary winding for controlling application of said input DC source to said primary winding;
rectifying/smoothing means connected to said secondary winding for generating a DC output by rectifying and smoothing an output of said secondary winding;
output voltage sensing means connected to receive said DC output for generating an analog signal having a voltage level representing a difference between said DC output and a predetermined reference signal, said analog signal being varied in a range equal to a maximum voltage level or less in response to said difference;
starting means connected to said first control electrode for starting said first switching means to close after a predetermined time from a time point at which said first switching means is opened, said control winding being connected to said first control electrode, and said control winding and said first control electrode forming a positive feedback loop to ensure complete closing of said first switching means when said first switching means is started to close;
second switching means connected to said first control electrode for opening said first switching means, said second switching means including a saturable reactor having a first winding connected to receive an output of said control winding, and a second winding magnetically coupled with said first winding and applied with said analog signal, said second switching means being operated based on a transition of impedance of said saturable reactor occuring when a predetermined time corresponding to a voltage level of said analog signal lapses from a time point at which said first switching means closes; and
means for altering a maximum amount of change in flux density of said saturable reactor in proportion to a voltage of said input DC source.

5. A switching power supply according to claim 4, wherein said altering means includes means for limiting said predetermined maximum voltage level of said analog signal to a voltage value proportional to the voltage of said input DC source.

6. A switching power supply according to claim 5, wherein a ratio of a voltage of said control winding applied to said first winding of said saturable reactor to said predetermined maximum voltage of said analog signal applied to said second winding is set to a value equal to a turn ratio of said first winding to said second winding of said saturable reactor or more.

7. A switching power supply according to claim 6, wherein said limiting means includes second rectifying/smoothing means connected to said secondary winding for obtaining a DC voltage having a level substantially equal to a crest value of the output of said secondary winding, and said output voltage sensing means includes an impedance element whose impedance varies in response to said difference, and said second rectifying/smoothing means, said impedance element, and said second winding are connected in series.

8. A switching power supply according to claim 6, wherein said limiting means includes means for directly supplying said input DC source, and said output voltage sensing means includes an impedance element whose impedance varies in response to said difference, and said input DC source, said impedance element, and said second winding are connected in series through said supplying means.

9. A switching power supply according to claim 4, wherein said first switching means includes a first transistor having two first main electrodes connected in series to said primary winding and having said first control electrode, and said second switching means includes a second transistor having two second main electrodes respectively connected to said first control electrode and one of said two first main electrodes and having a second control electrode, said second control electrode being connected through said first winding to receive a voltage of said control winding.

10. A switching power supply according to claim 4, wherein said first switching means includes a first transistor having two first main electrodes connected in series to said primary winding and having said first control electrode, and said second switching means includes a second transistor having two second main electrodes respectively connected to said first control electrode and one of said two first main electrodes and having a second control electrode connected to receive a voltage induced in said control winding, said first winding being connected in series to said two second main electrodes.

11. A switching power supply according to claim 9, wherein said starting means includes a resistor having one end connected to receive a voltage of said input DC source, and a capacitor having one end connected to the other end of said resistor, and the junction point between said resistor and said capacitor is connected to said first control electrode, and the other end of said capacitor is connected to receive a voltage induced in said control winding.

12. A switching power supply comprising:
a transformer having at least a primary winding connected to an input DC source, a secondary winding, and a control winding;
first switching means having a first control electrode and connected in series to said primary winding for controlling application of said input DC source to said primary winding;

rectifying/smoothing means connected to said secondary winding for generating a DC output by rectifying and smoothing an output of said secondary winding;

output voltage sensing means connected to receive said DC output for generating an analog signal representing a difference between said DC output and a predetermined reference signal;

starting means connected to said first control electrode for starting said first switching means to close after a predetermined time from a time point at which said first switching means is opened, said control winding being connected to said first control electrode, and said control winding and said first control electrode forming a positive feedback loop to ensure complete closing of said first switching means when said first switching means is started to close;

second switching means connected to said first control electrode for opening said first switching means, said second switching means including a saturable reactor having a first winding connected to receive an output of said control winding, and a second winding magnetically coupled with said first winding and applied with said analog signal, said second switching means being operated based on a transition of impedance of said saturable reactor occurring when a time length depending on a level of said analog signal lapses from a time point at which said first switching is closed; and means for limiting a maximum value of a change in flux density of said saturable reactor to a predetermined value.

13. A switching power supply according to claim 12, wherein said limiting means includes delay means connected to receive the output of said control winding for operating said second switching means when a predetermined time lapses from a time point at which said first switching means is started to close.

14. A switching power supply according to claim 12, wherein said limiting means includes delay means responsive to the output voltage of said secondary winding for operating said second switching means when a predetermined time lapses from starting of said first switching means to close.

15. A switching power supply according to claim 12, wherein said delay means includes means for supplying a pulse voltage to said second winding when said predetermined time lapses and for operating said second switching means through said saturable reactor.

16. A switching power supply according to claim 12, wherein said first switching means includes a first transistor having two first main electrodes connected in series to said primary winding and having said first control electrode, and said second switching means includes a second transistor having two second main electrodes respectively connected to said first electrode and one of said two first main electrodes, and having a second control electrode, said second control electrode being connected through said first winding to receive a voltage of said control winding.

17. A switching power supply according to claim 12, wherein said first switching means includes a first transistor having two first main electrodes connected in series to said primary winding and having said first control electrode, and said second switching means includes a second transistor having two second main electrodes respectively connected to said first control electrode and one of said two first main electrodes, and having a second control electrode connected to receive a voltage induced in said control winding, said first winding being connected in series to said two second main electrodes.

18. A switching power supply according to claim 16, wherein said switching means includes a resistor having one end connected to receive a voltage of said input DC source, and a capacitor having one end connected to the other end of said resistor, and the junction point between said resistor and said capacitor is connected to said first control electrode, and the other end of said capacitor is connected to receive a voltage induced in said control winding.

* * * * *